United States Patent
Rojas et al.

(10) Patent No.: US 7,209,478 B2
(45) Date of Patent: Apr. 24, 2007

(54) APPARATUS AND METHODS FOR DYNAMIC REALLOCATION OF VIRTUAL LANE BUFFER SPACE IN AN INFINIBAND SWITCH

(75) Inventors: Edmundo Rojas, Fort Collins, CO (US); S. Paul Tucker, Ft. Collins, CO (US)

(73) Assignee: Palau Acquisition Corporation (Delaware), Santa Clara, CA (US)

( * ) Notice: Subject to any disclaimer, the term of this patent is extended or adjusted under 35 U.S.C. 154(b) by 1007 days.

(21) Appl. No.: 10/160,938

(22) Filed: May 31, 2002

(65) Prior Publication Data

US 2003/0223416 A1   Dec. 4, 2003

(51) Int. Cl.
*H04L 12/50* (2006.01)
(52) U.S. Cl. ............... 370/360; 370/359; 370/389; 370/412; 370/351
(58) Field of Classification Search ........... 370/351, 370/357, 358, 359, 360, 389, 412, 413, 419, 370/390
See application file for complete search history.

(56) References Cited

U.S. PATENT DOCUMENTS

| | | | | |
|---|---|---|---|---|
| 6,904,545 B1* | 6/2005 | Erimli et al. | ............... | 714/43 |
| 2002/0085493 A1* | 7/2002 | Pekkala et al. | ............ | 370/235 |
| 2002/0091841 A1* | 7/2002 | Beukema et al. | ........... | 709/229 |
| 2002/0112099 A1* | 8/2002 | Collier | ......................... | 710/1 |
| 2002/0141427 A1* | 10/2002 | McAlpine | .................. | 370/413 |
| 2002/0159385 A1* | 10/2002 | Susnow et al. | ............ | 370/229 |
| 2003/0091055 A1* | 5/2003 | Craddock et al. | ........... | 370/412 |
| 2003/0193942 A1* | 10/2003 | Gil | ............................. | 370/389 |

* cited by examiner

*Primary Examiner*—Wing Chan
*Assistant Examiner*—Nguyen Ngo
(74) *Attorney, Agent, or Firm*—Borden Ladner Gervais LLP

(57) ABSTRACT

A switch for use with an InfiniBand network. The switch includes a crossbar that redirects packet-based data based on a forwarding table. At least one port that receives data from a network and selectively transfers that data to the crossbar using a variable number of virtual lanes. A state machine controls the changing of the number of virtual lanes.

10 Claims, 5 Drawing Sheets

APPARATUS AND METHODS FOR DYNAMIC REALLOCATION OF VIRTUAL LANE BUFFER SPACE IN AN INFINIBAND SWITCH

BACKGROUND OF THE INVENTION

InfiniBand is an emerging bus technology that hopes to replace the current PCI bus standard, which only supports up to 133 Mbps (Megabits per second) transfers, with a broader standard that supports a maximum shared bandwidth of 566 Mbps. InfiniBand is the culmination of the combined efforts of about 80 members that are led by Intel, Compaq, Dell, Hewlett-Packard, IBM, Microsoft and Sun Systems who collectively call themselves the InfiniBand Trade Association. The InfiniBand Trade Association has published a specification entitled: Infiniband™ Architecture Specification Release 1.0. The Specification spans three volumes and is incorporated herein by reference.

The InfiniBand Architecture (referred to herein as "IBA") is a first order interconnect technology, independent of the host operating system (OS) and processor platform, for interconnecting processor nodes and I/O nodes to form a system area network. IBA is designed around a point-to-point, switched I/O fabric, whereby end node devices (which can range from very inexpensive I/O devices like single chip SCSI or Ethernet adapters to very complex host computers) are interconnected by cascaded switch devices. The physical properties of the IBA interconnect support two predominant environments:

i. Module-to-module, as typified by computer systems that support I/O module add-in slots
ii. Chassis-to-chassis, as typified by interconnecting computers, external storage systems, and external LAN/WAN access devices (such as switches, hubs, and routers) in a data-center environment.

IBA supports implementations as simple as a single computer system, and can be expanded to include: replication of components for increased system reliability, cascaded switched fabric components, additional I/O units for scalable I/O capacity and performance, additional host node computing elements for scalable computing, or any combinations thereof. IBA is scalable to enable computer systems to keep up with the ever-increasing customer requirement for increased scalability, increased bandwidth, decreased CPU utilization, high availability, high isolation, and support for Internet technology. Being designed as a first order network, IBA focuses on moving data in and out of a node's memory and is optimized for separate control and memory interfaces. This permits hardware to be closely coupled or even integrated with the node's memory complex, removing any performance barriers.

IBA uses reliable packet based communication where messages are enqueued for delivery between end nodes. IBA defines hardware transport protocols sufficient to support both reliable messaging (send/receive) and memory manipulation semantics (e.g. remote DMA) without software intervention in the data movement path. IBA defines protection and error detection mechanisms that permit IBA transactions to originate and terminate from either privileged kernel mode (to support legacy I/O and communication needs) or user space (to support emerging interprocess communication demands).

IBA can support bandwidths that are anticipated to remain an order of magnitude greater than current I/O media (SCSI, Fiber Channel, and Ethernet). This enables IBA to act as a common interconnect for attaching I/O media using these technologies. To further ensure compatibility across varying technologies, IBA uses IPv6 headers, supporting extremely efficient junctions between IBA fabrics and traditional Internet and Intranet infrastructures.

FIG. 1 is a block diagram of the InfiniBand architecture layers 100. IBA operation can be described as a series of layers 100. The protocol of each layer is independent of the other layers. Each layer is dependent on the service of the layer below it and provides service to the layer above it.

The physical layer 102 specifies how bits are placed on a wire to form symbols and defines the symbols used for framing (i.e., start of packet & end of packet), data symbols, and fill between packets (Idles). It specifies the signaling protocol as to what constitutes a validly formed packet (i.e., symbol encoding, proper alignment of framing symbols, no invalid or nondata symbols between start and end delimiters, no disparity errors, synchronization method, etc.).

The link layer 104 describes the packet format and protocols for packet operation, e.g. flow control and how packets are routed within a subnet between the source and destination. There are two types of packets: link management packets and data packets.

Link management packets are used to train and maintain link operation. These packets are created and consumed within the link layer 104 and are not subject to flow control. Link management packets are used to negotiate operational parameters between the ports at each end of the link such as bit rate, link width, etc. They are also used to convey flow control credits and maintain link integrity.

Data packets convey IBA operations and can include a number of different headers. For example, the Local Route Header (LRH) is always present and it identifies the local source and local destination ports where switches will route the packet and also specifies the Service Level (SL) and Virtual Lane (VL) on which the packet travels. The VL is changed as the packet traverses the subnet but the other fields remain unchanged. The Global Route Header (GRH) is present in a packet that traverses multiple subnets. The GRH identifies the source and destination ports using a port's Global ID (GID) in the format of an IPv6 address.

There are two CRCs in each packet. The Invariant CRC (ICRC) covers all fields which should not change as the packet traverses the fabric. The Variant CRC (VCRC) covers all of the fields of the packet. The combination of the two CRCs allow switches and routers to modify appropriate fields and still maintain an end to end data integrity for the transport control and data portion of the packet. The coverage of the ICRC is different depending on whether the packet is routed to another subnet (i.e. contains a global route header).

The network layer 106 describes the protocol for routing a packet between subnets. Each subnet has a unique subnet ID, the Subnet Prefix. When combined with a Port GUID, this combination becomes a port's Global ID (GID). The source places the GID of the destination in the GRH and the LID of the router in the LRH. Each router forwards the packet through the next subnet to another router until the packet reaches the target subnet. Routers forward the packet based on the content of the GRH. As the packet traverses different subnets, the routers modify the content of the GRH and replace the LRH. The last router replaces the LRH using the LID of the destination. The source and destination GIDs do not change and are protected by the ICRC field. Routers recalculate the VCRC but not the ICRC. This preserves end to end transport integrity.

While, the network layer 106 and the link layer 104 deliver a packet to the desired destination, the transport layer 108 is responsible for delivering the packet to the proper queue pair and instructing the queue pair how to process the packet's data. The transport layer 108 is responsible for segmenting an operation into multiple packets when the message's data payload is greater than the maximum transfer unit (MTU) of the path. The queue pair on the receiving end reassembles the data into the specified data buffer in its memory.

IBA supports any number of upper layers 110 that provide protocols to be used by various user consumers. IBA also defines messages and protocols for certain management functions. These management protocols are separated into Subnet Management and Subnet Services.

FIG. 2 is a block diagram of an InfiniBand subnet 200. An IBA subnet 200 is composed of endnodes 202, switches 204, a subnet manager 206 and, possibly one or more router(s) 208. Endnodes 202 may be any one of a processor node, an I/O node, and/or a router (such as the router 208). Switches 202 are the fundamental routing component for intra-subnet communication. The switches 202 interconnect endnodes 202 by relaying packets between the endnodes 202. Routers 208 are the fundamental component for inter-subnet communication. Router 208 interconnects subnets by relaying packets between the subnets.

Switches 204 are transparent to the endnodes 202, meaning they are not directly addressed (except for management operations). Instead, packets transverse the switches 204 virtually unchanged. To this end, every destination within the subnet 200 is configured with one or more unique local identifiers (LID). From the point of view of a switch 204, a LID represents a path through the switch. Packets contain a destination address that specifies the LID of the destination. Each switch 204 is configured with forwarding tables (not shown) that dictate the path a packet will take through the switch 204 based on a LID of the packet. Individual packets are forwarded within a switch 204 to an out-bound port or ports based on the packet's Destination LID and the Switch's 204 forwarding table. IBA switches support unicast forwarding (delivery of a single packet to a single location) and may support multicast forwarding (delivery of a single packet to multiple destinations).

The subnet manager 206 configures the switches 204 by loading the forwarding tables into each switch 204. To maximize availability, multiple paths between endnodes may be deployed within the switch fabric. If multiple paths are available between switches 204, the subnet manager 206 can use these paths for redundancy or for destination LID based load sharing. Where multiple paths exists, the subnet manager 206 can re-route packets around failed links by re-loading the forwarding tables of switches in the affected area of the fabric.

FIG. 3 is a block diagram of an InfiniBand Switch 300. IBA switches, such as the switch 300, simply pass packets along based on the destination address in the packet's LRH. IBA switches do not generate or consume packets (except for management packets). Referring to FIG. 1, IBA switches interconnect the link layers 104 by relaying packets between the link layers 104.

In operation the switch 300 exposes two or more ports 302a, 302b . . . 302n, between which packets are relayed. Each port 302n communicates with a packet relay 304 via a set of virtual lanes 306a though 306n. The packet relay 304 (sometimes referred to as a "hub" or "crossbar") redirects the packet to another port 302, via that port's associated with virtual lanes 306, for transmission based on the forwarding table associated with the packet relay 304.

IBA provides data fields for customizing the operation of switches utilizing subnet management packets (SMPs) which are consumed by switches. For example, a Operational VL attribute is provided that allows the setting of the number of virtual lanes 306 that are active in a switch. However, while IBA is generous with the customizable features, no guidance has been provided on how to actually implement such features in hardware and software. The present Inventors have recognized a need for apparatus and methods to permit the dynamic reallocation of buffer space associated with virtual links in a switch in response to SMPs. The Inventors have further recognized a need to perform such dynamic reallocation without dropping packets if possible. The Inventors had additionally recognized the need to provide for a forced reallocation in the event that a graceful reallocation does not complete within a fixed amount of time.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
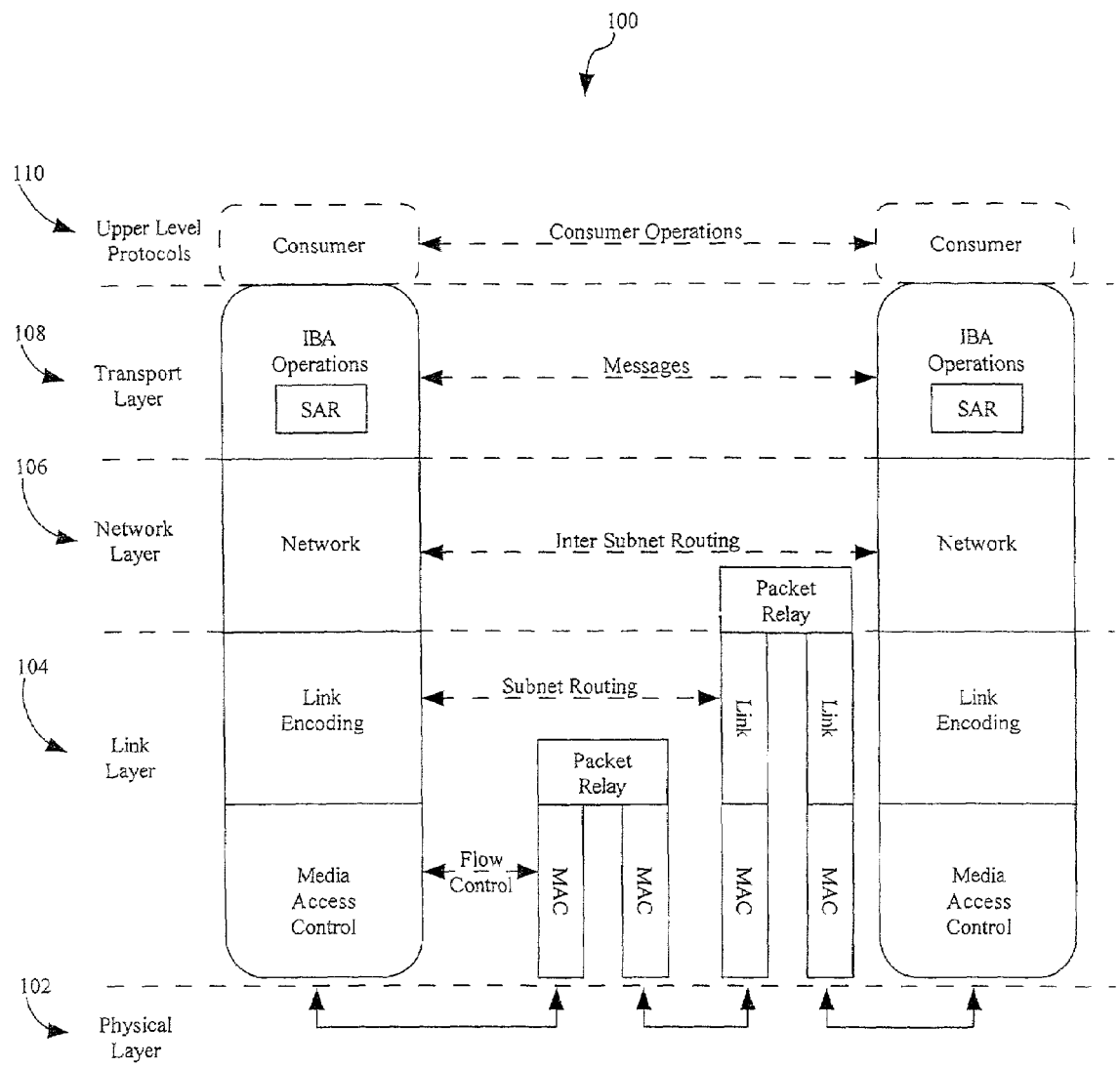
FIG. 1 is a block diagram of the InfiniBand architecture layers.
Figure 2:
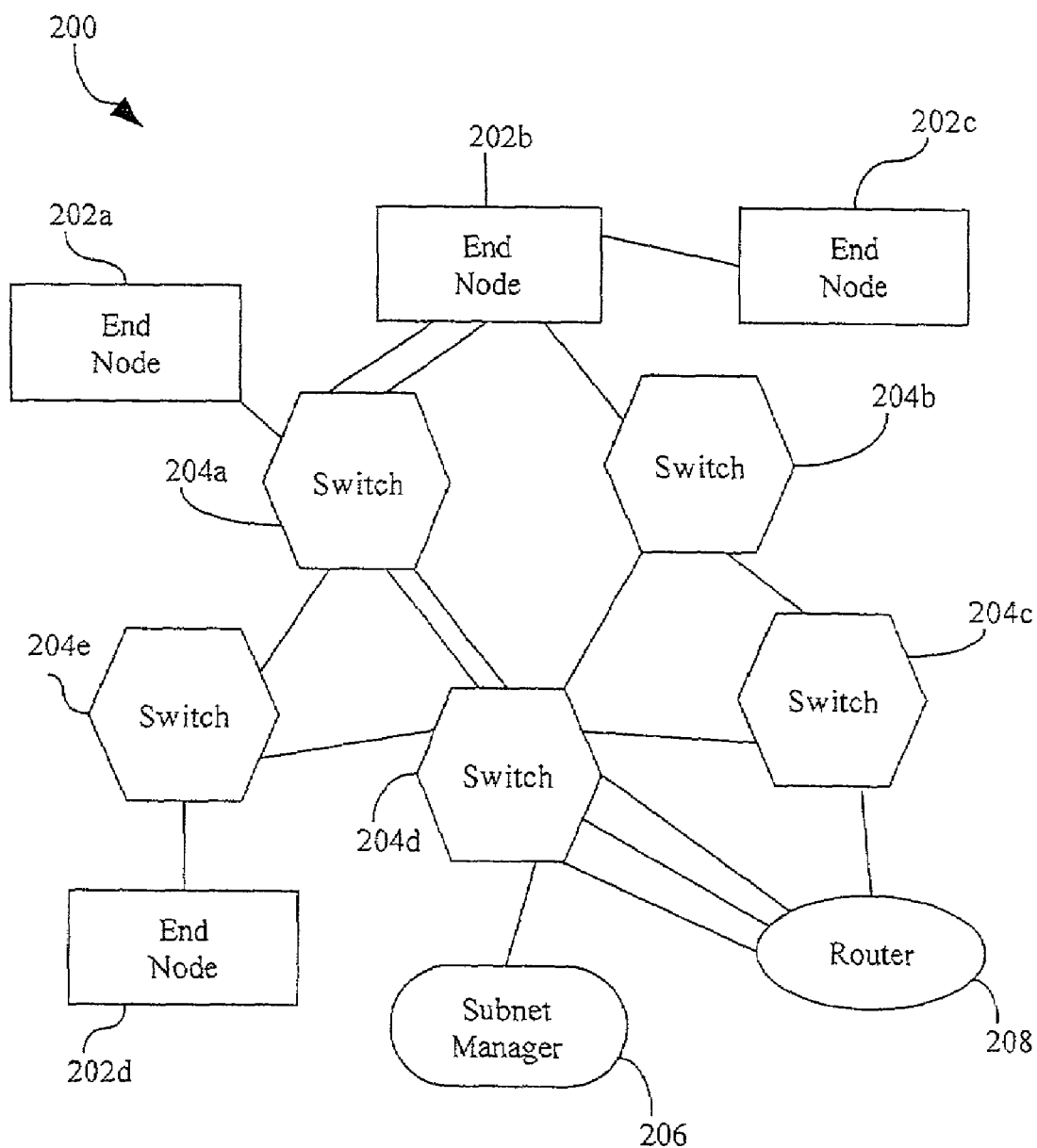
FIG. 2 is a block diagram of an InfiniBand subnet.

Reference will now be made in detail to the present invention, examples of which are illustrated in the accompanying drawings, wherein like reference numerals refer to like elements throughout.

In general, the present invention relates to apparatus and method steps embodied in software and associated hardware including computer readable medium, configured to store and/or process electrical or other physical signals to generate other desired signals. In general, the method steps require physical manipulation of data representing physical quantities. Usually, though not necessarily, such data takes the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities they represent and are merely convenient labels applied to such quantities.

Accordingly, the detailed description which follows contains descriptions of methods presented in terms of methods that are described using symbolic representations of data transfixed in a computer readable medium such as RAM, ROM, CR-ROM, DVD, hard disk, floppy disk, data communication channels such as USB, SCSI, or FIREWIRE and/or a network such as IBA, the Internet, or a LAN. These descriptions and representations are the means used by those skilled in the art effectively convey the substance of their work to others skilled in the art.

The term data processing device encompasses any of a variety of devices that are responsive to data and either perform some operation in response to the receipt thereof or modify the data in accordance with internal or external instructions that may be stored separately from the data processing devices or encoded into the structure of the data processing device. The term "method" is generally used to refer to a series of operations performed by a data processing device and, as such, encompasses such terms of art as "routine," "software," "program," "objects," "functions," "subroutines," and "procedures."

Unless otherwise noted, the methods recited herein may be enabled in one or more integrated circuits configured to perform the method steps taught herein. The required functional structures for such circuits appear in the description given below. Data processing devices that may be configured to perform the functions of the present invention include those manufactured by such companies as AGILENT and CISCO as well as other manufacturers of networking devices.

Figure 4:
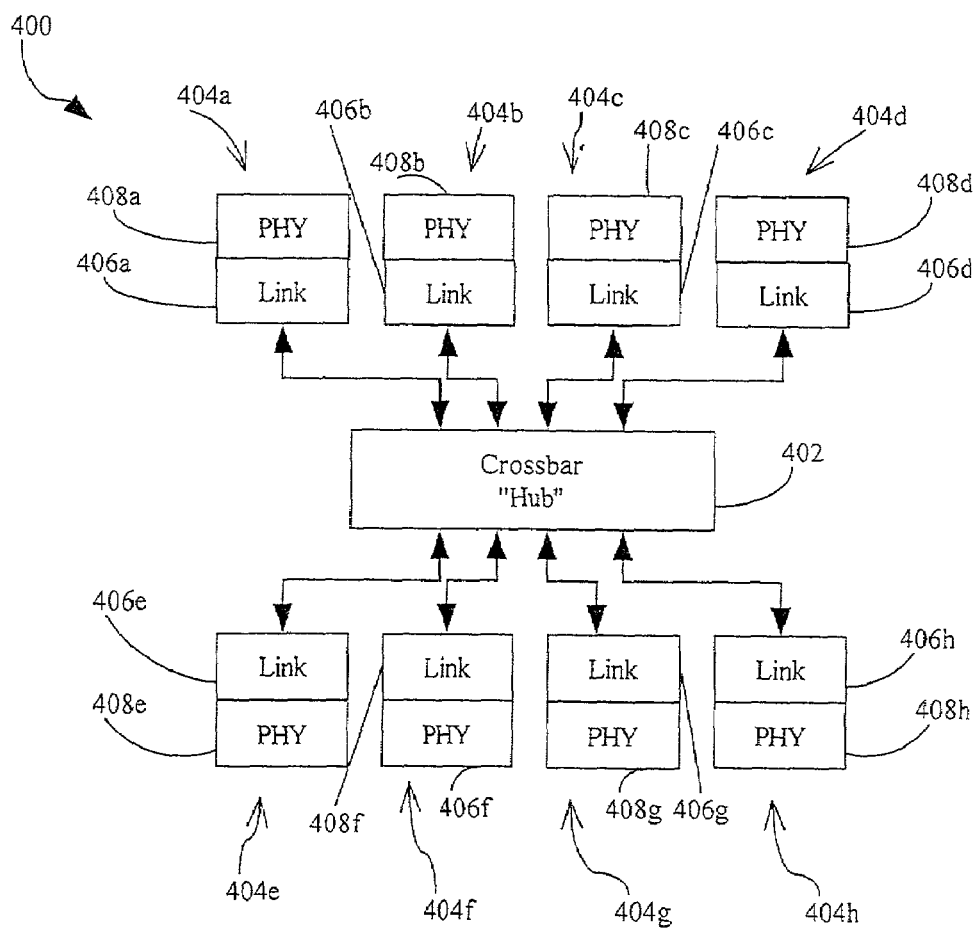
FIG. 4 is a block diagram of an InfiniBand switch in accordance with a preferred embodiment of the present invention.

FIG. 4 is a conceptual block diagram of a switch 400 in accordance with the preferred embodiment of the present invention. It will be appreciated by those of ordinary skill in the relevant arts that the switch 400, as illustrated in FIG. 4, and the operation thereof as described hereinafter is intended to be generally representative of such systems and that any particular switch may differ significantly from that shown in FIG. 4, particularly in the details of construction and operation. As such, the switch 400 is to be regarded as illustrative and exemplary and not limiting as regards the invention described herein or the claims attached hereto.

The switch 400 generally comprises a crossbar 402 (also referred to as a "hub") to which a plurality of ports 402a through 402h are connected. Each port 402 of the switch 400 generally comprises a link block 406 and a physical block 408 ("PHY"). In perhaps the preferred embodiment the crossbar 402 is a ten port device with two ports being reserved for management functions. FIG. 4 only portrays eight ports 402a through 402h for clarity of presentation.

The PHY block 408 primarily serves as a serialize to de-serialize ("SerDes") device. The link block 406 performs several functions, including the input buffer, receive ("RX"), transmit ("TX"), and flow control. The input virtual lanes (VLs) are physically contained in input buffers (not shown) of the link block 406. Other functions that may be performed by the link block 406 include: integrity checking, link state and status, error detecting and recording, flow control generation, and output buffering.

The crossbar 402 is preferably implemented as a sparsely populated data path structure. In essence, the crossbar 402 acts as a distributed MUX for every possible input to each output port. The crossbar 402 is preferably combinatorial, and capable of completing the switching process for one 32-bit word within one 250 MHz system clock period (4.0 ns).

Figure 5:
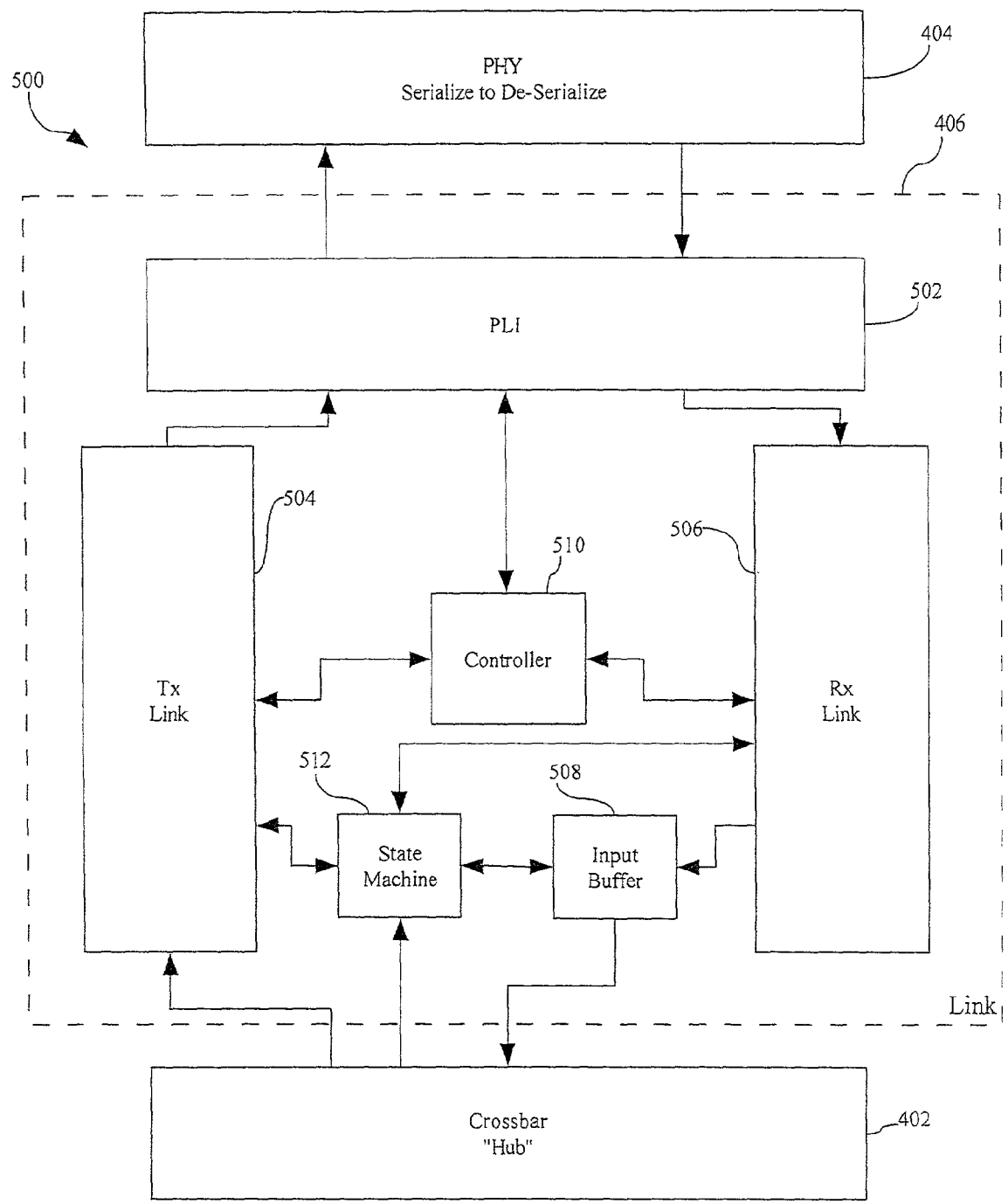
FIG. 5 is a block diagram of an InfiniBand switch in accordance with a preferred embodiment of the present invention.

FIG. 5 is a block diagram of an InfiniBand switch 500 in accordance with a preferred embodiment of the present invention. More specifically, FIG. 5 is a more detailed view of the switch 400 shown in FIG. 4 providing more detail of the link block 406. It will be appreciated by those of ordinary skill in the relevant arts that the switch 500, as illustrated in FIG. 5, and the operation thereof as described hereinafter is intended to be generally representative of such systems and that any particular switch may differ significantly from that shown in FIG. 5, particularly in the details of construction and operation. Further, only those functional elements that have bearing on the present invention have been portrayed so as to focus attention on the salient features of the inventive features. As such, the switch 500 is to be regarded as illustrative and exemplary and not limiting as regards the invention described herein or the claims attached hereto.

The link block 406 generally comprises a phy-link interface 502 (the "PLI") connected to a transmit link 504 (the "Tx Link") and a receive link (the "Rx Link") 506. The Rx link 506 outputs to input buffer 508 for transfer of data to the crossbar 402. A controller 510, primarily comprising registers, controls the operation of the transmit and receive links 504 and 506.

The PLI 502 connects transmitter and receiver portions of the PHY block 404 to the link block 406's Tx Link 504 and Rx Link 506. The receive portion of the PLI 502 realigns the data from the PHY block 404 and detects special characters and strings of characters, such as a start of packet (SOP) indicator, from the receiver data stream.

The Rx Link 506 accepts packet data from the PLI 502, performs certain checks, and passes the data on to the input buffer 508. The Tx Link 504 sends data packets that are ready to transfer from the Hub 402 to the PHY block 404, through the PLI 502. In doing so, the Tx Link 504 realigns the data, adds the placeholder for the start/end packet control characters, and calculates and inserts the VCRC field. In addition to data packets, the Tx Link 504 also accepts and transmit flow control link packets from a flow control state machine (not shown).

Figure 3:
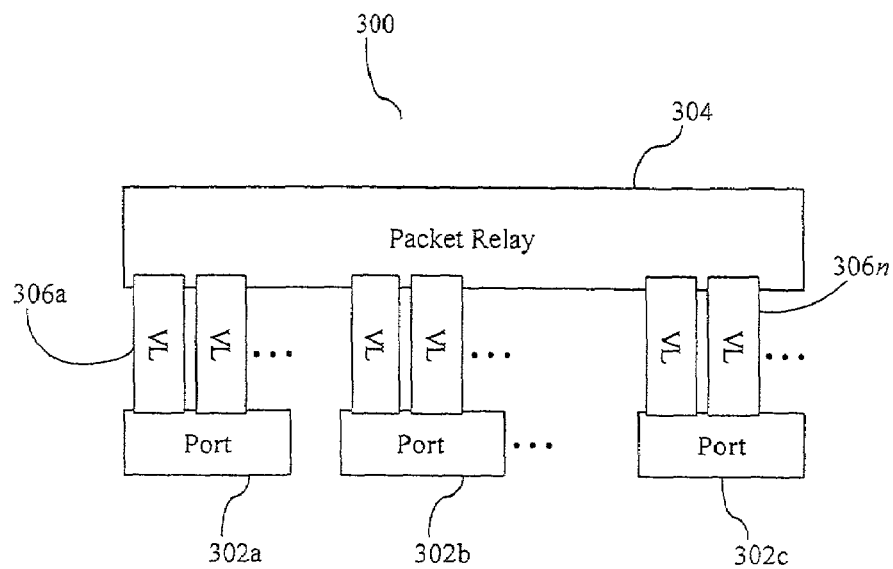
FIG. 3 is a block diagram of an InfiniBand switch.

A state machine 512 dynamically reallocates VL buffer space in the line 406 by managing memory in the input buffer 508, which as noted above physically contains the virtual lanes 306 (see FIG. 3). The state machine 512 is responsive to flow control messages (stripped and forwarded by the PLI 502) for dividing the available memory in the input buffer 508 among the virtual lanes 306 (see FIG. 3). In general, a link 406 supports 1, 2, 4, or 8 virtual lanes 306. For each link 406, the virtual lanes are preferably implemented in a single, contiguous memory.

The amount of memory allocated to each virtual lane is initially determined by dividing the total size of the memory by the number of VL configured (as defined by the OperationalVL attribute). As the switch 500 receives packets they are stored (partially or entirely) in the input buffer 508, in the space defined for the packet's virtual lane. In an active link 406, several packets can reside in the virtual lanes in the input buffer 508. An SMP can, at any time, change the number of configured virtual lanes forcing a redistribution of the amount of memory allocated to each virtual lane. The state machine 512 controls this process.

Figure 6:
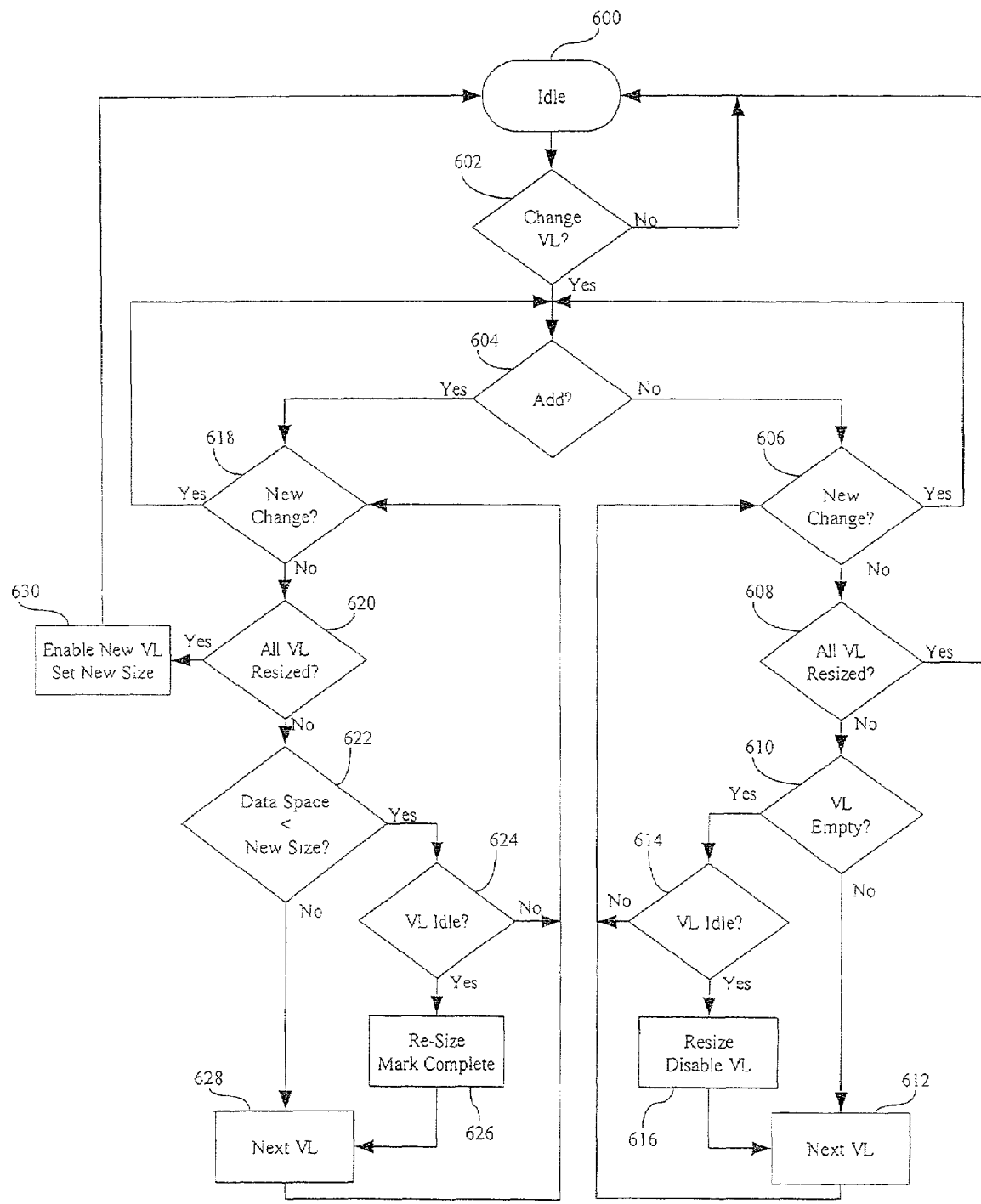
FIG. 6 is a flow chart of the operation of an InfiniBand switch in accordance with a preferred embodiment of the present invention.

FIG. 6 is a flow chart of the operation of an InfiniBand switch in accordance with a preferred embodiment of the present invention. More specifically, the flow chart shown in FIG. 6 illustrates the operation of the state machine 512 (see FIG. 5) and in particular, the method for redistributing memory among dynamically changing virtual lanes.

The method starts in step 600 with the state machine 512 at idle. In step 602, a check is made to determine if a change in the number of virtual lanes has been requested. Such a check could automatically be made periodically (such as every clock cycle) by checking a register, such as in the controller 510, or by sending a control signal to the state machine 512. Once it is determined that a change in the number of virtual lanes 306 has been requested, the method goes to step 604 and a check is made to determine if the change request was for the addition or the deletion of virtual lanes 306.

If a deletion of virtual lanes has been requested the method goes to step 606 where a check is made as to whether a more recent request for a change in the number of virtual lanes 306 has been made. If such a request has been made, the method returns to step 604 and a determination is re-made as to whether lanes need to be added or deleted. Assuming that no new changes have been requested, the method proceed to step 608 where a loop is setup by making a determination as to whether the requested changes (in this case deletion of a lane) have been made. The first time through the answer will of course be NO and the method will proceed to step 610. In subsequent iterations, once the requested changes have all been made, the method will exit to step 600.

In step 610, a determination is made as to whether a virtual lane is empty. If the virtual lane is not empty, the method proceeds to step 612 where a next virtual lane is selected and the method loops to step 606 for a check of the lane (after checking for an updated request). Once an empty virtual lane is found a check is made in step 614 as to whether the lane is idle, or whether it is expecting data. Should the identified lane not be idle, the method returns to step 606. Assuming that the lane is not active, it is disabled and the remaining lanes are resized, e.g. increased. The method then proceeds to step 612, a next lane is selected and the method returns to step 606 to process further deletions if required.

If virtual lanes 306 are to be added, the method goes to step 618 and a check is made as to whether a more recent request for a change in the number of virtual lanes 306 has been made. If such a request has been made, the method returns to step 604 and a determination is re-made as to whether lanes need to be added or deleted. Assuming that no new changes have been requested, the method proceed to step 620 where a loop is setup by making a determination as to whether the requested changes (in this case addition of a lane) have been made. The first time through the answer will of course be NO and the method will proceed to step 622. In subsequent iterations, once the requested changes have all been made, the method will proceed to step 630 where the new virtual lanes will be enabled, followed by an exit to step 600.

In step 622, a virtual lane is checked to determine whether the data in an identified virtual lane is less than the new required size. If the data is less than the new size, the method proceeds to step 624 and a check is made to determine whether the virtual lane is idle. Should the identified lane not be idle, the method returns to step 618. Assuming that the lane is not active, it is resized and marked complete (either in a register or in some data structure that described the virtual lane) in step 626. The method then proceeds to step 628, a next lane is selected and the method returns to step 618 to process the remaining virtual lanes to make room for the new virtual lanes to be added in step 630.

The method portrayed in FIG. 6 allows the dynamic reallocation of virtual lane buffer space in an active or inactive link without dropping packets. Although an embodiment of the present invention has been shown and described, it will be appreciated by those skilled in the art that changes may be made in such embodiment without departing from the principles and spirit of the invention, the scope of which is defined in the claims and their equivalents. For example, timers could be added to the method to force a re-sizing, with possible packet loss, after a certain amount of time has expired. The amount of time could be fixed or adjusted by management packets. Additionally, the method could be enhanced to send control information and flow control updates, to the remote link (the link on the other end of the IBA connection) to regulate to flow of packets during the change.

What is claimed is:

1. A switch for use with an InfiniBand network, the switch comprising:
   a crossbar that redirects packet-based data;
   at least one port that receives the packet-based data from a network and selectively transfers the packet-based data to the crossbar over a dynamically variable number of virtual lanes allocated within a buffer; and
   a state machine that controls dynamic variation of the number of virtual lanes during active transmission and reception of the packet-based data;
   wherein the state machine adds virtual lanes by monitoring existing virtual lanes and resizing the existing virtual lanes when the amount of data in each existing virtual lane is less than the required size for the resized lane; and creating a new virtual lane using the space created by the resizing; and
   wherein the state machine further monitors the amount of time that has been spent monitoring existing virtual lanes and upon the expiration of a predetermined amount of time, resizes the existing virtual lanes.

2. The switch, as set forth in claim 1, wherein the state machine is configured to reallocate space within the buffer to accommodate dynamic variation of the number of virtual lanes.

3. A switch for use with an InfiniBand network, the switch comprising:
   a crossbar that redirects packet-based data;
   at least one port that receives the packet-based data from a network and selectively transfers the packet-based data to the crossbar over a dynamically variable number of virtual lanes allocated within a buffer; and
   a state machine that controls dynamic variation of the number of virtual lanes during active transmission and reception of the packet-based data;
   wherein the state machine deletes virtual lanes by monitoring existing virtual lanes and, when a virtual lane is identified as being empty and idle, disabling the empty and idle virtual lane and resizing the remaining virtual lanes; and
   wherein the state machine further monitors the amount of time that has been spent monitoring existing virtual lanes and upon the expiration of a predetermined amount of time, disables a virtual lane.

4. A method for reconfiguring the number of virtual lanes within an Infiniband switch, the method comprising:
   determining, during active transmission or reception of data packets, that the number of virtual lanes within the switch requires adjustment;
   dynamically reallocating buffer space to add a virtual lane by monitoring existing virtual lanes and monitoring the amount of time that has been spent monitoring existing virtual lanes, resizing the existing virtual lanes upon the expiration of a predetermined amount of time and when the amount of data in each existing virtual lane is less than the required size for the resized lane, and creating a new virtual lane using the space created by the resizing.

5. The method of claim 4, wherein the step of determining comprises receiving a subnet management packet (SMP).

6. The method of claim 4, wherein the step of determining comprises receiving an OperationalVL attribute.

7. The method of claim 6, wherein the steps of identifying and resizing are repeated for each existing virtual lane.

8. The method of claim 4, wherein dynamically reallocating buffer space to add a virtual lane comprises:
   identifying an idle virtual lane;
   resizing the idle virtual lane to a predetermined new virtual lane size, thereby freeing up buffer space to add the virtual lane; and
   adding the virtual lane.

9. The method of claim 4, wherein dynamically reallocating buffer space to delete a virtual lane comprises:
   identifying an idle virtual lane;
   disabling the idle virtual lane, thereby freeing up buffer space; and
   reallocating the buffer space associated with the idle virtual lane amongst enabled virtual lanes.

10. A method for reconfiguring the number of virtual lanes within an Infiniband switch, the method comprising:
    determining, during active transmission or reception of data packets, that the number of virtual lanes within the switch requires adjustment;
    dynamically reallocating buffer space to delete a virtual lane by monitoring existing virtual lanes and monitoring the amount of time that has been spent monitoring existing virtual lanes; identifying a virtual lane as being empty and idle and, upon expiration of a predetermined amount of time, disabling the empty and idle virtual lane; and resizing the remaining virtual lanes.

* * * * *